US012204037B2

(12) United States Patent
Böhler et al.

(10) Patent No.: US 12,204,037 B2
(45) Date of Patent: Jan. 21, 2025

(54) SYSTEM FOR DETERMINING A RELATIVE POSITION AND/OR A RELATIVE DISTANCE OF A TRANSMITTER WITH RESPECT TO A RECEIVER, AND INDUCTIVE VEHICLE CHARGING SYSTEM HAVING SUCH A SYSTEM

(71) Applicant: BRUSA Elektronik AG, Sennwald (CH)

(72) Inventors: Lukas Böhler, Wangs (CH); Richard Knuchel, Altstätten (CH); Marc Hanselmann, Frümsen (CH)

(73) Assignee: BRUSA Elektronik AG, Sennwald (CH)

( * ) Notice: Subject to any disclaimer, the term of this patent is extended or adjusted under 35 U.S.C. 154(b) by 981 days.

(21) Appl. No.: 17/252,408

(22) PCT Filed: Jun. 24, 2019

(86) PCT No.: PCT/EP2019/066659
§ 371 (c)(1),
(2) Date: Dec. 15, 2020

(87) PCT Pub. No.: WO2020/002226
PCT Pub. Date: Jan. 2, 2020

(65) Prior Publication Data
US 2021/0261007 A1    Aug. 26, 2021

(30) Foreign Application Priority Data
Jun. 29, 2018 (DE) .................. 10 2018 115 795.9

(51) Int. Cl.
*H02J 7/00* (2006.01)
*B60L 53/126* (2019.01)
(Continued)

(52) U.S. Cl.
CPC .......... *G01S 5/0009* (2013.01); *B60L 53/126* (2019.02); *B60L 53/36* (2019.02); *B60L 53/38* (2019.02);
(Continued)

(58) Field of Classification Search
CPC ........ B60L 53/126; B60L 53/36; B60L 53/38; H02J 50/90; H02J 50/10; H02J 7/00032; H02J 7/00034
(Continued)

(56) References Cited

U.S. PATENT DOCUMENTS 6,421,600 B1 * 7/2002 Ross ..................... B60L 5/005
                                                                    180/2.1
6,792,259 B1 * 9/2004 Parise ............... H01M 8/04007
                                                                    455/343.1
(Continued)

FOREIGN PATENT DOCUMENTS

| EP | 3103674 A1 | 12/2016 |
|---|---|---|
| WO | WO 2015096997 A1 | 7/2015 |
| WO | WO 2017218122 A1 | 12/2017 |

*Primary Examiner* — Alexis B Pacheco
(74) *Attorney, Agent, or Firm* — Hoffmann & Baron, LLP

(57) ABSTRACT

A system for determining a relative position and/or a relative distance of a transmitter with respect to a receiver, including: the transmitter for wirelessly emitting signals at the time $t_i$, the receiver or receiving a signal at the time $t_i+\Delta t$, wherein the receiver is configured to determine the following: a signal level P and/or a signal-to-noise ratio SNR of the received signal, a direction of incidence of the received signal and, on the basis of P and E, a relative position POS of the transmitter with respect to the receiver and/or a relative distance D between the transmitter and the receiver, and another transmitter connected to the receiver and intended to wirelessly transmit P, SNR, POS, and/or D to another receiver connected to the transmitter.

10 Claims, 2 Drawing Sheets

(51) Int. Cl.
| | |
|---|---|
| *B60L 53/36* | (2019.01) |
| *B60L 53/38* | (2019.01) |
| *G01S 5/00* | (2006.01) |
| *G01S 5/02* | (2010.01) |
| *H02J 7/14* | (2006.01) |
| *H02J 50/10* | (2016.01) |
| *H02J 50/90* | (2016.01) |
| *B60K 6/28* | (2007.10) |
| *G05D 1/00* | (2006.01) |

(52) U.S. Cl.
CPC ........ *G01S 5/0284* (2013.01); *H02J 7/00032* (2020.01); *H02J 50/10* (2016.02); *H02J 50/90* (2016.02); *B60K 6/28* (2013.01); *B60Y 2200/91* (2013.01); *B60Y 2200/92* (2013.01); *B60Y 2300/91* (2013.01); *G05D 1/0225* (2013.01); *H02J 7/00034* (2020.01); *H02J 2310/48* (2020.01)

(58) Field of Classification Search
USPC .......................................................... 320/108
See application file for complete search history.

(56) References Cited

U.S. PATENT DOCUMENTS

| | | | |
|---|---|---|---|
| 2011/0302078 A1* | 12/2011 | Failing | B60L 53/126 |
| | | | 700/297 |
| 2013/0229153 A1* | 9/2013 | Sarkar | B60L 3/04 |
| | | | 320/137 |
| 2015/0042168 A1* | 2/2015 | Widmer | H02J 50/80 |
| | | | 307/104 |
| 2016/0023565 A1* | 1/2016 | Bell | B60L 53/36 |
| | | | 320/108 |
| 2016/0318413 A1* | 11/2016 | Roehrl | H02J 50/60 |
| 2017/0355275 A1* | 12/2017 | Kwasnick | H02J 50/10 |
| 2018/0048178 A1* | 2/2018 | Leabman | H02J 7/00034 |
| 2020/0164754 A1* | 5/2020 | Seong | H02J 50/12 |

* cited by examiner

SYSTEM FOR DETERMINING A RELATIVE POSITION AND/OR A RELATIVE DISTANCE OF A TRANSMITTER WITH RESPECT TO A RECEIVER, AND INDUCTIVE VEHICLE CHARGING SYSTEM HAVING SUCH A SYSTEM

CROSS-REFERENCE TO RELATED APPLICATIONS

The present application is the U.S. National Phase of PCT/EP2019/066659, filed on Jun. 24, 2019, which claims priority to German Patent Application No. 10 2018 115 795.9, filed on Jun. 29, 2018, the entire contents of which are incorporated herein by reference.

BACKGROUND

Field

The invention relates to a system for determining a relative position and/or a relative distance of a transmitter with respect to a receiver, and to an inductive vehicle charging system having such a system.

Related Art

Inductive vehicle charging systems typically include a floor module and a vehicle module, electrical energy being transmitted inductively from the floor module to the vehicle module. For an optimal energy transfer it is necessary that the vehicle module is optimally positioned relative to the floor module. Since the floor module is typically installed in a stationary manner, the vehicle must be guided in such a way that it reaches this optimal relative position of the vehicle module and the floor module.

To determine the current relative position of the floor module and the vehicle module, both modules exchange signals that are evaluated with a view to determining a current relative position.

In the case of autonomously controlled or semi-autonomously controlled vehicles, the vehicle is controlled on the basis of the currently determined relative position. In the case of manually controlled vehicles, the current relative position or information derived therefrom is advantageously displayed in the vehicle for the driver.

SUMMARY

The object of the invention is to indicate a system that is improved over the prior art for determining a relative position and/or a relative distance of a transmitter with respect to a receiver, and an inductive vehicle charging system having such a system.

The invention results from the features of the independent claims. Advantageous further refinements and embodiments are the subject of the dependent claims. Further features, potential applications, and advantages of the invention result from the following description and from the explanation of embodiments of the invention, which are shown in the drawings.

In the prior art, the relative position of the vehicle module to the floor module is determined by evaluating a positioning signal in the floor module, the positioning signal being emitted by a transmitter of the vehicle module arranged in the vehicle.

The invention is based on the knowledge that the signal transmission characteristics change dynamically due to the changing relative distance between the vehicle module and the floor module during the approaching process of the vehicle module and floor module. This change naturally causes a change in the damping of the positioning signal received in the floor module. At the same time, the positioning signal received by the floor module must have a specific amplitude in order to even allow an exact position calculation.

In the receiving unit of the floor module, a high amplification of the received signal is therefore typically required for large distances between the floor module and the vehicle module and a small amplification of the received signal for small distances between the floor module and the vehicle module in order to prevent overdriving of the receiving unit in the floor module.

The basic idea of the invention now consists in dynamically changing the transmission power of the transmitter contained in the vehicle module and/or the damping properties of the entire signal transfer path and adapting it to the current distance between the floor module and the vehicle module in each case. Of course, the idea of the invention also includes the reverse case, in which the positioning signal is emitted from the floor module and is received and evaluated in the vehicle module.

A first aspect of the invention relates to a system for determining a relative position $POS_{S1-E2}$ and/or a relative distance $D_{S1-E2}$ of a transmitter S1 with respect to a receiver E2, the system including: the transmitter S1 for wirelessly emitting signals $Sig_{S1}(t_i)$ at the time $t_i$, with time transit index i=1, 2, . . . , the transmitter S1 being designed and configured to adjust a signal level $P(Sig_{S1}(t_i))$ and/or a carrier frequency $F(Sig_{S1}(t_i))$ of the signal $Sig_{S1}(t_i)$; the receiver E2 for receiving the signal $Sig_{S1}(t_i)$ at the time $t_i+\Delta t$ as signal $Sig_{E2}(t_i+\Delta t)$, where $\Delta t$ is a signal transit time, where: $2\Delta t < |t_{i+1} - t_i|$, in particular $2\Delta t << |t_{i+1} - t_i|$, and where the receiver E2 is designed and configured to determine the following: a signal level $P(Sig_{E2}(t_i+\Delta t))$ of the received signal $Sig_{E2}$ and/or a signal-to-noise ratio $SNR(Sig_{E2}(t_i+\Delta t))$ of the received signal $Sig_{E2}(t_i+\Delta t)$, a direction of incidence $\vec{E}_2$ of the received signal $Sig_{E2}(t_i+\Delta t)$; and, on the basis of $P(Sig_{E2}(t+\Delta t))$ and $\vec{E}_2$, the relative position $POS_{S1-E2}$ of the transmitter S1 with respect to the receiver E2 and/or the relative distance $D_{S1-E2}$ between the transmitter S1 and the receiver E2, and a transmitter S2 which is connected to the receiver E2 and is intended to wirelessly transmit the determined signal level $P(Sig_{E2}(t_i+\Delta t))$ and/or the determined signal-to-noise ratio $SNR(Sig_{E2}(t_i+\Delta t))$ and/or the direction of incidence $\vec{E}_2$ and/or the relative position $POS_{S1-E2}$ and/or the distance $D_{S1-E2}$ to a receiver E1 which is connected to the transmitter S1; wherein the transmitter S1 is further designed and configured such that the signal level $P(Sig_{S1}(t_{i+1}))$ and/or the carrier frequency $F(Sig_{S1}(t_{i+1}))$ of the signal $Sig_{S1}(t_{i+1})$ emitted in the next time step $t_{i+1}$ is/are adjusted depending on the signal level $P(Sig_{E2}(t_i+\Delta t))$ and/or the signal-to-noise ratio $SNR(Sig_{E2}(t_i+\Delta t))$ and/or the relative position $POS_{S1-E2}$ and/or the distance $D_{S1-E2}$, and/or that the signal $Sig_{S1}(t_{i+1})$ emitted in the next time step $t_{i+1}$ includes information dependent on one of the signal level $P(Sig_{E2}(t_i+\Delta t))$ and/or the signal-to-noise ratio $SNR(Sig_{E2}(t_i+\Delta t))$ and/or the relative position $POS_{S1-E2}$ and/or the distance $D_{S1-E2}$, said information being indicative of at least one damping parameter DP for adjusting the damping of a signal $Sig_{E2}(t_{i+1}+\Delta t)$ received by the receiver E2.

The term "relative position $POS_{S1\text{-}E2}$" is understood in this case in particular to indicate the positions of the transmitter S1 and the receiver E2 in a coordinate system whose origin either coincides with the current position of the transmitter S1 or the receiver E2. Of course, the relative position $POS_{S1\text{-}E2}$ can also be indicated in a specified absolute coordinate system.

The term "relative distance $D_{S1\text{-}E2}$" is the geometric distance between transmitter S1 and receiver E2; in particular the relative distance $D_{S1\text{-}E2}$ gives the geometric distance of a projection of the position of the transmitter S1 and a projection of the position of the receiver E2 onto a horizontal plane.

The transmission of signals and information from the transmitter S1 to the receiver E2 and from the transmitter S2 to the receiver E1 takes place by radio transmission. The signals contain the corresponding information, preferably encoded information. The encoded information is preferably implemented in the WLAN protocol.

The receiver E2 receives the signals $Sig_{S1}(t_i)$ as signals $Sig_{E2}(t_i+\Delta t)$. $\Delta t$ indicates the transit time of the signals from the transmitter S1 to the receiver E2. In the simplest case, quasi-optical propagation is assumed for the signal propagation. In the case of multipath propagation, the signal $Sig_{E2}(t_i+\Delta t)$ representing the quasi-optical propagation is advantageously determined in the receiver E2 and used for further processing. For this purpose, the receiver E2 advantageously has a unit which, during a multipath propagation of the signals $Sig_{E1}(t)$, determines the respective line-of-sight signal as signals $Sig_{E2}(t_i+\Delta t)$.

Advantageously, the following applies: $2\Delta t<|t_{i+1}-t_i|$, in particular $2\Delta t<<|t_{i+1}-t_i|$, i.e., the period between two successive emissions of a signal $Sig_{S1}(t_i)$ from the transmitter S1 is at least greater than twice the signal transit time $\Delta t$; advantageously the period between two successive transmissions of a signal $Sig_{S1}(t_i)$ from the transmitter S1 is very much greater than twice the signal transit time $\Delta t$.

After the signal $Sig_{S1}(t_i)$ emitted by the transmitter S1 arrives at the receiver E2 as signal $Sig_{E2}(t_i+\Delta t)$, the signal level $P(Sig_{E2}(t_i+\Delta t))$ of the received signal $Sig_{E2}(t_i+\Delta t)$ and/or a signal-to-noise ratio $SNR(Sig_{E2}(t_i+\Delta t))$ of the received signal $Sig_{E2}(t_i+\Delta t)$, and a direction of incidence $\vec{E}_2$ of the received signal $Sig_{E2}(t_i+\Delta t)$ are determined. For determining the direction of incidence $\vec{E}_2$ of the received signal $Sig_{E2}(t_i+\Delta t)$, the receiver E2 advantageously has three or more differently oriented and arranged receiving antennas/receiving coils which detect the signal $Sig_{E2}(t_i+\Delta t)$ as received signals $Sig_{E2,k}(t_i+\Delta t)$ in each case, wherein the received signals $Sig_{E2,k}(t_i+\Delta t)$ as well as their determined signal level $P(Sig_{E2}(t_i+\Delta t)=P(Sig_{E2,k}(t_i+\Delta t))$ are used with $k=1, 2, 3, \ldots, K$ and $K\geq 3$ for determining the direction of incidence $\vec{E}_2$. The signal level $P(Sig_{E2}(t_i+\Delta t))$ is thus understood as a vector with dimensions K in the present case.

On the basis of the received signal level $P(Sig_{E2}(t_i+\Delta t))$ and the determined direction of incidence $\vec{E}_2$, the relative position $POS_{S1\text{-}E2}$ of the transmitter S1 with respect to the receiver E2 and/or the relative distance $D_{S1\text{-}E2}$ between the transmitter S1 and the receiver E2 is determined. This is advantageously done in an evaluation means connected to the receiver E2.

The transmitter S2 connected to the receiver E2 is designed and configured according to the invention in such a way that the determined signal level $P(Sig_{E2}(t_i+\Delta t))$ and/or the determined signal-to-noise ratio $SNR(Sig_{E2}(t_i+\Delta t))$ and/or the relative position $POS_{S1\text{-}E2}$ and/or the distance $D_{S1\text{-}E2}$ is advantageously transmitted as encoded information to the receiver E1 connected to the transmitter S1. This transmitted information is advantageously used on the one hand when generating the signal $Sig_{S1}(t_{i+1})$ to be emitted in the next time step $t_{i+1}$ and on the other hand at least partially for the autonomous control of a vehicle or for generating an output in the vehicle.

The transmitter S1 and the receiver E1 are advantageously arranged in one structural unit and the transmitter S2 and the receiver E2 are advantageously arranged in another structural unit. The structural units are preferably the floor unit and the vehicle unit of a system for inductively charging a vehicle. The floor unit is preferably arranged/fixed in a fixed position on the floor. The vehicle unit is installed in a vehicle, in particular in an electric vehicle or hybrid vehicle.

The transmitter S1 is advantageously designed and configured such that the signal level $P(Sig_{S1}(t_{i+1}))$ and/or the carrier frequency $F(Sig_{S1}(t_{i+1}))$ of the signal $Sig_{S1}(t_{i+1})$ to be emitted in the next time step $t_{i+1}$ is/are adjusted only dependent on the signal level $P(Sig_{E2}(t_i+\Delta t))$ and/or the signal-to-noise ratio $SNR(Sig_{E2}(t_i+\Delta t))$.

In addition or as an alternative, the transmitter S1 is advantageously designed and configured in such a way that the signal $Sig_{S1}(t_{i+1})$ emitted in the next time step $t_{i+1}$ includes information dependent on only one of the signal level $P(Sig_{E2}(t_i+\Delta t))$ and/or the signal-to-noise ratio $SNR(Sig_{E2}(t_i+\Delta t))$, which information is indicative of at least one damping parameter DP for adjusting the damping of a signal $Sig_{E2}(t_{i+1}+\Delta t)$ received by the receiver E2. When receiving the signal $Sig_{E2}(t_{i+1}+\Delta t)$, the receiver E2 also receives the information about the damping with which the received signal should be processed in the receiver E2. For example, given high received signal levels $P(Sig_{E2}(t_i+\Delta t))$, a correspondingly large specified damping can mean that there is no overload in the receiver E2.

The signals $Sig_{S1}(t_i)$ and the signals $Sig_{S2}(t)$ to transmit the information of the determined signal level $P(Sig_{E2}(t_i+\Delta t))$ and/or the determined signal-to-noise ratio $SNR(Sig_{E2}(t_i+\Delta t))$ and/or the direction of incidence $\vec{E}_2$ and/or the relative position $POS_{S1\text{-}E2}$ and/or the distance $D_{S1\text{-}E2}$ from the transmitter S2 with respect to the receiver E1 contain this information as encoded information.

The proposed system thus makes it possible, in particular, to dynamically adapt the emitted signal strength and/or the carrier frequency of the signals emitted by the transmitter S1 when the transmitter S1 and the receiver E2 approach, so that it is ensured that an optimal signal strength is always received in the receiver E2. This optimal signal strength always allows for an optimal evaluation of the relative position or the relative distance from the transmitter S1 with respect to the receiver E2 and prevents electrical overload of the receiver E2.

By changing the carrier frequency, the transmitted signal $Sig_{S1}(t_i)$ is detuned, so that a lower reception power is generated in the receiver, which operates on a target carrier frequency. In addition or as an alternative to adapting the signal strength of the signals $Sig_{S1}(t_i)$ emitted by the transmitter S1, the damping in the signal chain in the receiver E2 is advantageously adapted for the received signal. This in particular prevents overloading of the receiver E2 and thus increases the service life of the receiver E2.

An advantageous development of the proposed system is characterized in that the transmitter S1 and the receiver E1 are connected to a prediction module PM, wherein the prediction module PM is designed and configured in such a way that, based on a signal $Sig_{S1}*(t)$ emitted in an imaginary manner, a signal level $P_{predicted}(Sig_{E2}*(t+\Delta t))$ is predicted or can be predicted for this signal received at the receiver E2 in an imaginary manner at the time $t+\Delta t$ as signal $Sig_{E2}*(t_{i+1}+\Delta t)$.

In this development, the transmitter S1 is also designed and configured in such a way that the signal level $P(Sig_{S1}(t_{i+1}))$ and/or the carrier frequency $F(Sig_{S1}(t_{i+1}))$ of the signal $Sig_{S1}(t_{i+1})$ actually to be emitted at the time $t_{i+1}$ and/or the at least one damping parameter DP thus transmitted in such a way are adjusted/determined, that for the predicted signal level $P_{predicted}(Sig_{E2}(t_{i+1}+\Delta t))$ of this signal received by the receiver E2 as $Sig_{E2}(t_{i+1}+\Delta t)$ the following applies: $G1 \leq P_{predicted}(Sig_{E2}(t_{i+1}+\Delta t)) \leq G2$ and/or for a predicted corresponding signal-to-noise ratio $SNR_{predicted}(Sig_{E2}(t_{i+1}+\Delta t))$ the following applies: $G3 \leq SNR_{predicted}(Sig_{E2}(t_{i+1}+\Delta t)) \leq G4$, where G1, G2, G3 and G4 are specified limit values.

This prediction is advantageously carried out within two successive time steps $t_i$, $t_{i+1}$.

For this purpose, the prediction of the signal level $P_{predicted}(Sig_{E2}(t_{i+1}+\Delta t))$ for the signal $Sig_{S1}(t_{i+1})$ is the prediction module PM to be emitted by the transmitter S1 at the time $t_{i+1}$, which arrives at the receiver E2 at the time $t_{i+1}+\Delta t$ as signal $Sig_{E2}(t_{i+1}+\Delta t)$, advantageously on the basis of a model-based simulation. This simulation is advantageously carried out on the basis of the input variables: $Sig_{S1}(t_i)$, $P(Sig_{E2}(t_i+\Delta t))$ and/or $SNR(Sig_{E2}(t_i+\Delta t))$ and/or $POS_{S1\text{-}E2}$ and/or $D_{S1\text{-}E2}$ and/or the at least one damping parameter DP, wherein $POS_{S1\text{-}E2}$, $D_{S1\text{-}E2}$, and DP each result from the signal $Sig_{S1}(t_i)$ emitted in the time step $t_i$. These data are provided to the prediction module PM in each case.

An advantageous development of the proposed system is characterized in that the transmitter S1 has a signal generator for generating a basic signal $SIG0_{S1}$ and a downstream signal shaping unit for signal shaping and amplification/damping of the signal $SIG0_{S1}$ to form the signal $Sig_{S1}(t)$, wherein for the signal $Sig_{S1}(t_{i+1})$ generated by the signal shaping unit the following applies:

$$Sig_{S1}(t_{i+1}) = F1[SIG0_{S1}, P(Sig_{E2}(t_i+\Delta t)) \text{ and/or } Sig_{S1}(t_i) \text{ and/or } SNR(Sig_{E2}(t_i+\Delta t)) \text{ and/or } POS_{S1\text{-}E2} \text{ and/or } D_{S1\text{-}E2}], \quad (1)$$

with F1: =mathematical function of $SIG0_{S1}$ and of $P(Sig_{E2}(t_i+\Delta t))$ and/or $Sig_{S1}(t_i)$ and/or $SNR(Sig_{E2}(t_i+\Delta t))$ and/or $POS_{S1\text{-}E2}$ and/or $D_{S1\text{-}E2}$. The following also advantageously applies to the signal $Sig_{S1}(t_{i+1})$ generated by the signal shaping unit:

$$Sig_{S1}(t_{i+1}) = F2[F1[SIG0_{S1}, P(Sig_{E2}(t_i+\Delta t)) \text{ and/or } Sig_{S1}(t_i) \text{ and/or } SNR(Sig_{E2}(t_i+\Delta t)) \text{ and/or } POS_{S1\text{-}E2} \text{ and/or } D_{S1\text{-}E2}], P_{predicted}(Sig_{E2}(t_{i+1}+\Delta t))], \quad (2)$$

with F2: =mathematical function of F1[ . . . ] and $P_{predicted}(Sig_{E2}(t_{i+1}+\Delta t))$.

The functions F1 and F2 thus describe a mathematical relationship between the basic signal $SIG0_{S1}$ and the signal $Sig_{S1}(t_{i+1})$ to be emitted in the next time step $t_i$ taking into account the specified parameters. Such functions F1 and F2 can be defined, for example, on the basis of test measurement series and/or on the basis of signal transmission models which model the electronic components, in particular of the receiver E2.

An advantageous development of the proposed system is characterized in that the transmitter S1 and the receiver E1 are part of a vehicle module arranged in a vehicle for inductive charging of the vehicle, in particular a vehicle-mounted energy storage device, and wherein the transmitter S2 and the receiver E2 are part of a floor module for inductive charging of the vehicle, wherein energy is transmitted inductively from the floor module to the vehicle module for charging the vehicle. In this development, the transmitter S1 particularly advantageously emits the signals $Sig_{S1}(t_i)$ via a transmission coil on the vehicle module side, which transmission coil is also configured and designed to receive the energy inductively transmitted from the floor module to the vehicle module.

An alternative advantageous development of the proposed system is characterized in that the transmitter S2 and the receiver E2 are part of a vehicle module arranged in a vehicle for inductive charging of the vehicle, in particular a vehicle-mounted energy storage device, and wherein the transmitter S1 and the receiver E1 are part of a floor module for inductive charging of the vehicle, wherein energy is transmitted inductively from the floor module to the vehicle module for charging the vehicle. In this development, the transmitter S1 particularly advantageously emits the signals $Sig_{S1}(t_i)$ via a transmission coil which is also configured and designed for emitting the inductively transmitted energy from the floor module to the vehicle module.

Another aspect of the invention relates to an inductive charging system for a vehicle with a system as described above, in which the transmitter S1 and the receiver E1 are arranged in a vehicle module in the vehicle, and the transmitter S2 and the receiver E2 are arranged in a floor module, wherein the energy for charging the vehicle is inductively transmitted from the floor module to the vehicle module.

Another aspect of the invention relates to an inductive charging system for a vehicle with a system as described above, in which the transmitter S2 and the receiver E are arranged in a vehicle module in the vehicle, and the transmitter S1 and the receiver E1 are arranged in a floor module, wherein the energy for charging the vehicle is inductively transmitted from the floor module to the vehicle module.

Another aspect of the invention relates to a method for determining a relative position $POS_{S1\text{-}E2}$ and/or a relative distance $D_{S1\text{-}E2}$ of a transmitter S1 with respect to a receiver E2, with the following steps:

In one step, wirelessly emitting a signal $Sig_{S1}(t_i)$ takes place from the transmitter S1 at the time $t_i$, with time transit index i=1, 2, . . . , wherein the transmitter S1 adjusts a signal level $P(Sig_{S1}(t))$ and/or a carrier frequency $F(Sig_{S1}(t_i))$ of the signal $Sig_{S1}(t)$.

In a further step, receiving the signal $Sig_{S1}(t_i)$ takes place at the receiver E2 at the time $t_i+\Delta t$ as signal $Sig_{E2}(t_i+\Delta t)$, where $\Delta t$ is a signal transit time, where: $2\Delta t < |t_i - t_i|$, in particular $2\Delta t \ll |t_{i+1} - t_i|$, and where the receiver E2 determines the following:

a signal level $P(Sig_{E2}(t_i+\Delta t))$ of the received signal $Sig_{E2}$ and/or a signal-to-noise ratio $SNR(Sig_{E2}(t_i+\Delta t))$ of the received signal $Sig_{E2}(t_i+\Delta t)$, a direction of incidence E2 of the received signal $Sig_{E2}(t_i+\Delta t)$, and, on the basis of $P(Sig_{E2}(t_i+\Delta t))$ and E2, the relative position $POS_{S1\text{-}E2}$ of the transmitter S1 with respect to the receiver E2 and/or the relative distance $D_{S1\text{-}E2}$ between the transmitter S1 and the receiver E2.

In a further step, wirelessly transmitting the determined signal level $P(Sig_{E2}(t_i+\Delta t))$ and/or the determined signal-to-noise ratio $SNR(Sig_{E2}(t_i+\Delta t))$ and/or the direction of incidence E2 and/or the relative position $POS_{S1\text{-}E2}$ and/or the distance $D_{S1\text{-}E2}$ to a receiver E1 which is connected to the transmitter S1 is carried out by a transmitter S2 connected to the receiver E2.

The transmitter S1 is also designed to adjust the signal level $P(Sig_{S1}(t_{i+1}))$ and/or the carrier frequency $F(Sig_{S1}(t_{i+1}))$ of the signal $Sig_{S1}(t_{i+1})$ emitted in the next time step $t_{i+1}$ depending on the signal level $P(Sig_{E2}(t_i+\Delta t))$ and/or the signal-to-noise ratio $SNR(Sig_{E2}(t_i+\Delta t))$ and/or the relative position $POS_{S1-E2}$ and/or the distance $D_{S1-E2}$, and/or to complement/encode the signal $Sig_{S1}(t_{i+1})$ emitted by the transmitter S1 in the next time step $t_{i+1}$ with information dependent on one of the signal level $P(Sig_{E2}(t_i+\Delta t))$ and/or the signal-to-noise ratio $SNR(Sig_{E2}(t_i+\Delta t))$ and/or the relative position $POS_{S1}$ and/or the distance $D_{S1-E2}$, which information is indicative of at least one damping parameter DP for adjusting the damping of a signal $Sig_{E2}(t_{i+1}+\Delta t)$ received by the receiver E2.

An advantageous development of the proposed method is characterized in that the transmitter S1 and the receiver E1 are connected to a prediction module PM, wherein the prediction module PM predicts a signal level $P_{predicted}(Sig_{E2}*(t_{i+1}+\Delta t))$ for a signal $Sig_{S1}*(t_{i+1})$ to be emitted by the transmitter S1 at the time $t_i$, based on the signal $Sig_{S1}*(t_i)$ emitted in an imaginary manner and based on $P(Sig_{E2}(t_i+\Delta t))$ and/or $SNR(Sig_{E2}*(t_i+\Delta t))$ and/or $POS_{S1-E2}$ and/or $D_{S1-E2}$ and/or the at least one damping parameter DP, which signal is received by the receiver E2 at the time $t_{i+1}+\Delta t$ as signal $Sig_{E2}*(t_{i+1}+\Delta t)$, and the transmitter S1 adjusts/determines the signal level $P(Sig_{S1}(t_{i+1}))$ and/or the carrier frequency $F(Sig_{S1}(t_{i+1}))$ of the signal $Sig_{S1}(t_{i+1})$ actually to be emitted at the time $t_{i+1}$ and/or the at least one damping parameter DP thus transmitted in such a way that for the predicted signal level $P_{predicted}(Sig_{E2}(t_{i+1}+\Delta t))$ of this signal received by the receiver E2 as $Sig_{E2}(t_{i+1}+\Delta t)$ the following applies: $G1 \leq P_{predicted}(Sig_{E2}(t_{i+1}+\Delta t)) \leq G2$ and/or for a predicted corresponding signal-to-noise ratio $SNR_{predicted}(Sig_{E2}(t_{i+1}+\Delta t))$ the following applies: $G3 \leq SNR_{predicted}(Sig_{E2}(t_{i+1}+\Delta t)) \leq G4$, where G1, G2, G3 and G4 are specified limit values.

An advantageous development of the proposed method is characterized in that the transmitter S1 has a signal generator for generating a basic signal $SIG0_{S1}$ and a downstream signal shaping unit for signal shaping and amplification of the signal $SIG0_{S1}$ to form the signal $Sig_{S1}(t)$, wherein for the signal $Sig_{S1}(t_{i+1})$ generated by the signal shaping unit the following applies:

$$Sig_{S1}(t_{i+1}) = F1[SIG0_{S1}, P(Sig_{E2}(t_i+\Delta t)) \text{ and/or } SNR(Sig_{E2}(t_i+\Delta t)) \text{ and/or } POS_{S1-E2} \text{ and/or } D_{S1-E2}], \quad (1)$$

with F1: = mathematical function of $SIG0_{S1}$ and of $P(Sig_{E2}(t_i+\Delta t))$ and/or $SNR(Sig_{E2}(t_i+\Delta t))$ and/or $POS_{S1-E2}$ and/or $D_{S1-E2}$.

The following also advantageously applies to the signal $Sig_{S1}(t_i)$ generated by the signal shaping unit:

$$Sig_{S1}(t_{i+1}) = F2[F1[SIG0_{S1}, P(Sig_{=E2}(t_i+\Delta t)) \text{ and/or } SNR(Sig_{E2}(t_i+\Delta t)) \text{ and/or } POS_{S1-E2} \text{ and/or } D_{S1-E2}], P_{predicted}(Sig_{E2}(t_{i+1}+\Delta t))], \quad (2)$$

with F2: = mathematical function of F1[ . . . ] and $P_{predicted}(Sig_{E2}(t_{i+1}+\Delta t))$.

Advantageous developments and advantages of the proposed method result from analogous and analogous transfer of statements made in connection with the proposed system, to which reference is made in this regard.

Further advantages, features and details result from the following description, in which—if necessary with reference to the drawings—at least one embodiment is described in detail. Identical, similar, and/or functionally identical parts are provided with the same reference signs.

DETAILED DESCRIPTION

Figure 1:
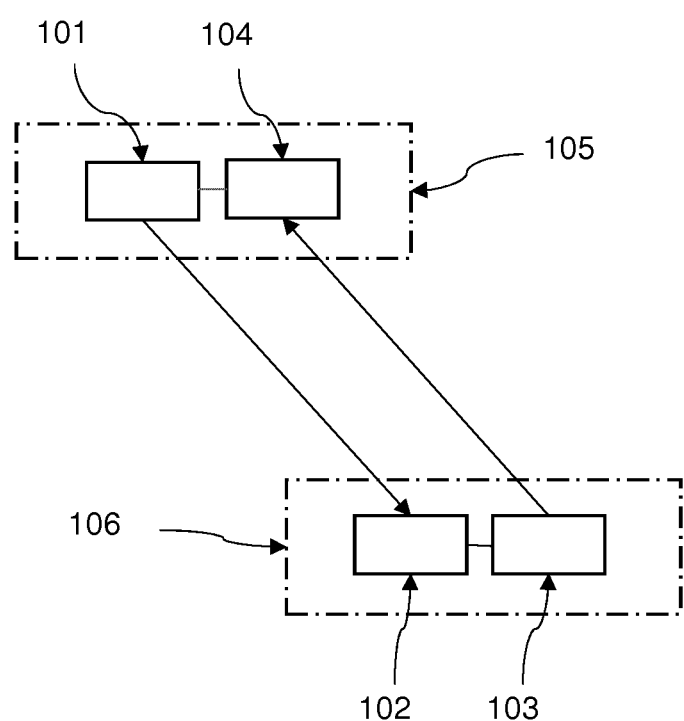
FIG. 1 shows a highly schematic structure of a proposed system.

FIG. 1 shows a highly schematic structure of a proposed system for determining a relative position $POS_{S1-E2}$ and/or a relative distance $D_{S1-E2}$ of a transmitter S1 101 with respect to a receiver E2 102. The system includes the transmitter S1 101 for wirelessly emitting signals $Sig_{S1}(t_i)$ at the time $t_i$, with time transit index i=1, 2, . . . , the transmitter S1 101 being designed and configured to adjust a signal level $P(Sig_{S1}(t_i))$ and a carrier frequency $F(Sig_{S1}(t_i))$ of the signal $Sig_{S1}(t_i)$.

The system further includes the receiver E2 102 for receiving the signal $Sig_{S1}(t_i)$ at the time $t_i+\Delta t$ as signal $Sig_{E2}(t_i+\Delta t)$, where $\Delta t$ is a signal transit time, where: $2\Delta t \ll |t_{i+1}-t_i|$. The receiver E2 102 is designed and configured to determine the following:

- a signal level $P(Sig_{E2}(t_i+\Delta t))$ of the received signal $Sig_{E2}(t_i+\Delta t)$ and a signal-to-noise ratio $SNR(Sig_{E2}(t_i+\Delta t))$ of the received signal $Sig_{E2}(t_i+\Delta t)$,
- a direction of incidence $\vec{E}_2$ of the received signal $Sig_{E2}(t_i+\Delta t)$, and,
- on the basis of $P(Sig_{E2}(t_i+\Delta t))$ and $\vec{E}_2$, the relative position $POS_{S1-E2}$ of the transmitter S1 101 with respect to the receiver E2 102 and the relative distance $D_{S1-E2}$ between the transmitter S1 101 and the receiver E2 102.

The system further includes a transmitter S2 103 which is connected to the receiver E2 102 and is intended to wirelessly transmit the determined signal level $P(Sig_{E2}(t_i+\Delta t))$ and the determined signal-to-noise ratio $SNR(Sig_{E2}(t_i+\Delta t))$ and the relative position $POS_{S1-E2}$ and the distance $D_{S1-E2}$ to a receiver E1 104 which is connected to the transmitter S1 101.

The transmitter S1 101 is further designed and configured such that the signal level $P(Sig_{S1}(t_{i+1}))$ and the carrier frequency $F(Sig_{S1}(t_{i+1}))$ of the signal $Sig_{S1}(t_{i+1})$ emitted in the next time step $t_{i+1}$ is/are adjusted depending on the signal level $P(Sig_{E2}(t_i+\Delta t))$ and the signal-to-noise ratio $SNR(Sig_{E2}(t_i+\Delta t))$.

In addition, the transmitter S1 101 is further designed and configured that the signal $Sig_{S1}(t_{i+1})$ emitted in the next time step $t_i$ includes information dependent on one of the signal level $P(Sig_{E2}(t_i+\Delta t))$ and the signal-to-noise ratio $SNR(Sig_{E2}(t_i+\Delta t))$, which information is indicative of at least one damping parameter DP for adjusting the damping of a signal $Sig_{E2}(t_{i+1}+\Delta t)$ received by the receiver E2 102.

In the present case, the transmitter S1 101 and the receiver E1 104 are arranged in a vehicle module 105 in a vehicle, in particular an electric vehicle, and the transmitter S2 103 and the receiver E2 102 are arranged in a floor module 106, and together form an inductive charging system for the vehicle.

The device allows for dynamic adaptation of the signal level and the carrier frequency of the signal $Sig_{S1}(t_{i+1})$ to be emitted in the next time step as well as an advantageous coding of a damping parameter DP in the signal $Sig_{S1}(t_{i+1})$ to be emitted, the damping parameter indicating damping with which the signal $Sig_{E2}(t_{i+1}+\Delta t)$ received by the receiver E2 is to be dampened. For this purpose, the receiver E2 has a corresponding device for decoding the damping parameter and for adjusting a corresponding reception damping.

Figure 2:
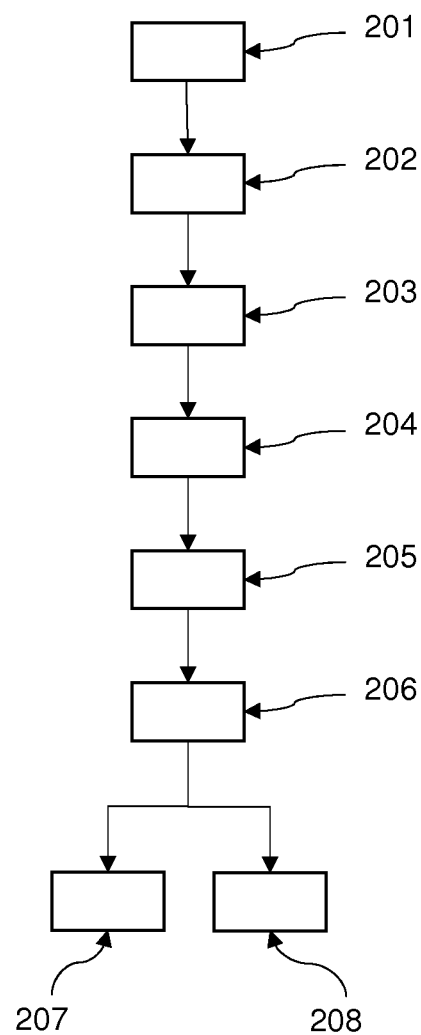
FIG. 2 shows a highly schematic method flow of a proposed method.

FIG. 2 shows a highly schematic method flow of a proposed method for determining a relative position $POS_{S1\text{-}E2}$ and a relative distance $D_{S1\text{-}E2}$ of a transmitter S1 with respect to a receiver E2. The method includes the following steps. In a step 201, wirelessly emitting a signal $Sig_{S1}(t_i)$ takes place from the transmitter S1 at the time $t_i$, with time transit index i=1, 2, ..., wherein the transmitter S1 adjusts a signal level $P(Sig_{S1}(t_i))$ and a carrier frequency $F(Sig_{S1}(t_i))$ of the signal $Sig_{S1}(t_i)$.

In a step 202, receiving the signal $Sig_{S1}(t_i)$ takes place at the receiver E2 at the time $t_i+\Delta t$ as signal $Sig_{E2}(t_i+\Delta t)$, where $\Delta t$ is a signal transit time, where: $2\Delta t<|t_{i+1}-t_i|$.

In a step 203, determining a signal level $P(Sig_{E2}(t_i+\Delta t))$ of the received signal $Sig_{E2}$ and a signal-to-noise ratio SNR $(Sig_{E2}(t_i+\Delta t))$ of the received signal $Sig_{E2}(t_i+\Delta t)$ is carried out by the receiver E2.

In a step 204, determining a direction of incidence $\vec{E}_2$ of the received signal $Sig_{E2}(t_i+\Delta t)$ is carried out by the receiver E2.

In a step 205, determining the relative position $POS_{S1\text{-}E2}$ of the transmitter S1 with respect to the receiver E2 and the relative distance $D_{S1\text{-}E2}$ between the transmitter S1 and the receiver E2 is carried out by the receiver E2 on the basis of $P(Sig_{E2}(t_i+\Delta t))$ and $\vec{E}_2$.

In a step 206, wirelessly transmitting the determined signal level $P(Sig_{E2}(t_i+\Delta t))$ and the determined signal-to-noise ratio $SNR(Sig_{E2}(t_i+\Delta t))$ and the relative position $POS_{S1\text{-}E2}$ and the distance $D_{S1\text{-}E2}$ to a receiver E1 which is connected to the transmitter S1 is carried out by a transmitter S2 connected to the receiver E2.

In a step 207, the transmitter S1 adjusts the signal level $P(Sig_{S1}(t_{i+1}))$ and the carrier frequency $F(Sig_{S1}(t_{i+1}))$ of the signal $Sig_{S1}(t_{i+1})$ to be emitted in the next time step $t_{i+1}$ depending on the signal level $P(Sig_{E2}(t_i+\Delta t)$ and the signal-to-noise ratio $SNR(Sig_{E2}(t_i+\Delta t))$.

In a step 208, information is added to the signal $Sig_{S1}(t_{i+1})$ to be emitted by the transmitter S1 in the next time step $t_{i+1}$, which information is dependent on one of the signal level $P(Sig_{E2}(t_i+\Delta t))$ and the signal-to-noise ratio $SNR(Sig_{E2}(t_i+\Delta t))$, which information is indicative of at least one damping parameter DP for adjusting the damping of a signal $Sig_{E2}(t_{i+1}+\Delta t)$ received by the receiver E2.

Although the invention has been illustrated and explained in greater detail by means of preferred example embodiments, the invention is not limited by the disclosed examples and other variations may be derived therefrom by a person skilled in the art without departing from the scope of protection of the invention. It is therefore clear that there are a plurality of possible variations. It is also clear that embodiments cited by way of example actually only constitute examples that are not to be interpreted in any way as a limitation of the scope, potential applications, or configuration of the invention. Instead, the preceding description and the description of the figures allow the person skilled in the art to specifically implement the embodiments, wherein the person skilled in the art has knowledge of the disclosed inventive concept and is able to make numerous changes, for example, with respect to the function or the arrangement of individual elements cited in an example embodiment, without departing from the scope of protection, which is defined by the claims and their legal equivalents, such as a further explanation in the description.

LIST OF REFERENCE SIGNS

101 Transmitter S1
102 Receiver E2
103 Transmitter S2
104 Receiver E1
105 Vehicle module
106 Floor module

The invention claimed is:

1. A system to determine a relative position $POS_{S1\text{-}E2}$ and/or a relative distance $D_{S1\text{-}E2}$ of a transmitter S1 with respect to a receiver E2, the system comprising:
   the transmitter S1 configured to wirelessly emit signals $Sig_{S1}(t_i)$ at the time $t_i$, with a time transit index i=1, 2, ..., the transmitter S1 configured to adjust a signal level $P(Sig_{S1}(t_i))$ and/or a carrier frequency $F(Sig_{S1}(t_i))$ of the signal $Sig_{S1}(t_i)$;
   the receiver E2 configured to receive the signal $Sig_{S1}(t_i)$ at the time $t_i+\Delta t$ as signal $Sig_{E2}(t_i+\Delta t)$, where $\Delta t$ is a signal transit time, where: $2\Delta t<|t_{i+1}-t_i|$, in particular $2\Delta t<<|t_{i+1}-t_i|$, and where the receiver E2 is configured to determine the following:
      a signal level $P(Sig_{E2}(t_i+\Delta t))$ of the received signal $Sig_{E2}(t_i+\Delta t)$ and/or a signal-to-noise ratio SNR $(Sig_{E2}(t_i+\Delta t))$ of the received signal $Sig_{E2}(t_i+\Delta t)$,
      a direction of incidence $\vec{E}_2$ of the received signal $Sig_{E2}(t_i+\Delta t)$, and
      based on $P(Sig_{E2}(t_i+\Delta t))$ and $\vec{E}_2$, the relative position $POS_{S1\text{-}E2}$ of the transmitter S1 with respect to the receiver E2 and/or the relative distance $D_{S1\text{-}E2}$ between the transmitter S1 and the receiver E2; and
   a transmitter S2 which is connected to the receiver E2 and is configured to wirelessly transmit the determined signal level $P(Sig_{E2}(t_i+\Delta t))$ and the determined signal-to-noise ratio $SNR(Sig_{E2}(t_i+\Delta t))$ and/or the relative position $POS_{S1\text{-}E2}$ and/or the distance $D_{S1\text{-}E2}$ to a receiver E1 which is connected to the transmitter S1,
   wherein the transmitter S1 is configured to adjust the signal level $P(Sig_{S1}(t_{i+1}))$ and the carrier frequency $F(Sig_{S1}(t_i+\Delta t))$ of the signal $Sig_{S1}(t_{i+1})$ emitted in the next time step $t_{i+1}$ depending on the signal level $P(Sig_{E2}(t_i+\Delta t))$ and the signal-to-noise ratio $SNR(Sig_{E2}(t_i+\Delta t))$ and/or the relative position $POS_{S1\text{-}E2}$ and/or the distance $D_{S1\text{-}E2}$ transmitted by the transmitted S2, the transmitter S1 is further configured to add information to the signal $Sig_{S1}(t_{i+1})$ to be emitted by transmitter S1 in the next time step $t_{i+1}$, the information being dependent on one of the signal level $P(Sig_{E2}(t_i+\Delta t))$ and/or the signal-to-noise ratio $SNR(Sig_{E2}(t_i+\Delta t))$ and/or the relative position $POS_{S1\text{-}E2}$ and/or the distance $D_{S1\text{-}E2}$, wherein the receiver E2 is further configured to adjust at least one damping parameter DP depending on the information in order to dampen a signal $Sig_{E2}(t_{i+1}+\Delta t)$ received by the receiver E2.

2. The system according to claim 1, wherein the transmitter S1 and the receiver E1 are connected to a prediction module PM, wherein
   the prediction module PM is designed and configured in such a way that for a signal $Sig_{S1}*(t)$ emitted by the transmitter S1 in an imaginary manner, a signal level $P_{predicted}(Sig_{E2}*(t+\Delta t))$ is predicted for this signal received at the receiver E2 for the time $t+\Delta t$ as signal $Sig_{E2}*(t_{i+1}+\Delta t)$, and
   the transmitter S1 is designed and configured in such a way that the signal level $P(Sig_{S1}(t_{i+1}))$ and/or the carrier frequency $F(Sig_{S1}(t_{i+1}))$ of the signal $Sig_{S1}(t_{i+1})$ actually emitted at the time $t_{i+1}$ and/or the at least one damping parameter DP thus transmitted in such a way are adjusted/determined, that for the predicted signal level $P_{predicted}(Sig_{E2}(t_{i+1}+\Delta t))$ of this signal received by the receiver E2 as $\text{Sig}_{E2}(t_{i+1}+\Delta t)$ the following applies: $G1 \leq P_{predicted}(\text{Sig}_{E2}(t_{i+1}+\Delta t)) \leq G2$ and/or for a predicted corresponding signal-to-noise ratio $\text{SNR}_{predicted}(\text{Sig}_{E2}(t_{i+1}+\Delta t))$ the following applies: $G3 \leq \text{SNR}_{predicted}(\text{Sig}_{E2}(t_{i+1}+\Delta t)) \leq G4$, where G1, G2, G3 and G4 are specified limit values.

3. The system according to claim 2, wherein the prediction module PM predicts the signal level $P_{predicted}(\text{Sig}_{E2}*(t_{i+1}+\Delta t))$ based on a signal $\text{Sig}_{S1}*(t_i)$ emitted in an imaginary manner and based on $P(\text{Sig}_{E2}*(t_i+\Delta t))$ and/or $\text{SNR}(\text{Sig}_{E2}*(t_i+\Delta t))$ and/or $\text{POS}*_{S1-E2}(t_i+\Delta t)$ and/or $D*_{S1-E2}(t_i+\Delta t)$ and/or the at least one damping parameter $DP*(t_i+\Delta t)$ by simulating the signal transfer path.

4. The system according to claim 1, wherein the receiver E2 has three or more differently oriented and arranged receiving antennas/receiving coils whose received signals are used for determining the direction of incidence $\vec{E}_2$.

5. The system according to claim 1, wherein the transmitter S1 and the receiver E1 are part of a vehicle module for inductive charging of a vehicle and the transmitter S2 and the receiver E2 are part of a floor module for inductive charging of the vehicle, wherein energy is transmitted inductively from the floor module to the vehicle module for charging the vehicle.

6. The system according to claim 1, wherein the transmitter S2 and the receiver E2 are part of a vehicle module for inductive charging of a vehicle and the transmitter S1 and the receiver E1 are part of a floor module for inductive charging of the vehicle, wherein energy is transmitted inductively from the floor module to the vehicle module for charging the vehicle.

7. An inductive charging system for a vehicle with a system according to claim 1, in which the transmitter S1 and the receiver E1 are arranged in a vehicle module in the vehicle, and the transmitter S2 and the receiver E2 are arranged in a floor module, wherein energy for charging the vehicle is inductively transmitted from the floor module to the vehicle module.

8. An inductive charging system for a vehicle with a system according to claim 1, wherein the transmitter S2 and the receiver E2 are arranged in a vehicle module in the vehicle, and the transmitter S1 and the receiver E1 are arranged in a floor module, wherein the energy for charging the vehicle is inductively transmitted from the floor module to the vehicle module.

9. A method of determining a relative position $\text{POS}_{S1-E2}$ and/or a relative distance $D_{S1-E2}$ of a transmitter S1 with respect to a receiver E2, the method comprising:
wirelessly emitting a signal $\text{Sig}_{S1}(t_i)$ at the time $t_i$ from the transmitter S1, with time transit index $i=1, 2, \ldots$, wherein the transmitter S1 adjusts a signal level $P(\text{Sig}_{S1}(t_i))$ and/or a carrier frequency $F(\text{Sig}_{S1}(t_i))$ of the signal $\text{Sig}_{S1}(t_i)$;
receiving the signal $\text{Sig}_{S1}(t_i)$ at the receiver E2 at the time $t_i+\Delta t$ as signal $\text{Sig}_{E2}(t_i+\Delta t)$, where $\Delta t$ is a signal transit time, where: $2\Delta t < |t_{i+1}-t_i|$, in particular $2\Delta t \ll |t_{i+1}-t_i|$, and where the receiver E2 carries out the following:

determining a signal level $P(\text{Sig}_{E2}(t_i+\Delta t))$ of the received signal $\text{Sig}_{E2}$ and/or a signal-to-noise ratio $\text{SNR}(\text{Sig}_{E2}(t_i+\Delta t))$ of the received signal $\text{Sig}_{E2}(t_i+\Delta t)$, determining a direction of incidence $\vec{E}_2$ of the received signal $\text{Sig}_{E2}(t_i+\Delta t)$, and based on $P(\text{Sig}_{E2}(t_i+\Delta t))$ and $\vec{E}_2$, determining the relative position $\text{POS}_{S1-E2}$ of the transmitter S1 with respect to the receiver E2 and/or the relative distance $D_{S1-E2}$ between the transmitter S1 and the receiver E2; and wirelessly transmitting the determined signal level $P(\text{Sig}_{E2}(t_i+\Delta t))$ and the determined signal-to-noise ratio $\text{SNR}(\text{Sig}_{E2}(t_i+\Delta t))$ and/or the direction of incidence $\vec{E}_2$ and/or the relative position $\text{POS}_{S1-E2}$ and/or the distance $D_{S1-E2}$ to a receiver E1 which is connected to the transmitter S1 via a transmitter S2 connected to the receiver E2, wherein the transmitter S1 adjusts the signal level $P(\text{Sig}_{S1}(t_{i+1}))$ and the carrier frequency $F(\text{Sig}_{S1}(t_{i+1}))$ of the signal $\text{Sig}_{S1}(t_{i+1})$ emitted in the next time step $t_{i+1}$ depending on the signal level $P(\text{Sig}_{E2}(t_i+\Delta t))$ and the signal-to-noise ratio $\text{SNR}(\text{Sig}_{E2}(t_i+\Delta t))$ and/or the relative position $\text{POS}_{S1-E2}$ and/or the distance $D_{S1-E2}$ transmitted by the transmitter S2, and the transmitter S1 adds information to the signal $\text{Sig}_{S1}(t_{i+1})$ to be emitted by the transmitter S1 in the next time step $t_{i+1}$, the information being dependent on one of the signal level $P(\text{Sig}_{E2}(t_i+\Delta t))$ and/or the signal-to-noise ratio $\text{SNR}(\text{Sig}_{E2}(t_i+\Delta t))$ and/or the relative position $\text{POS}_{S1}$ and/or the distance $D_{S1-E2}$, wherein the receiver E2 adjusts at least one damping parameter DP depending on the information in order to dampen a signal $\text{Sig}_{E2}(t_{i+1}+\Delta t)$ received by the receiver E2.

10. The method according to claim 9, wherein the transmitter S1 and the receiver E1 are connected to a prediction module PM, wherein:
the prediction module PM predicts a signal level $P_{predicted}(\text{Sig}_{E2}*(t_{i+1}+\Delta t))$ for a signal $\text{Sig}_{S1}*(t_{i+1})$ to be emitted by the transmitter S1 at the time $t_{i+1}$, based on the transmitted signal $\text{Sig}_{S1}(t_i)$ and based on $P(\text{Sig}_{E2}(t_i+\Delta t))$ and/or $\text{SNR}(\text{Sig}_{E2}(t_i+\Delta t))$ and/or $\text{POS}_{S1-E2}$ and/or $D_{S1-E2}$ and/or the at least one damping parameter DP, which signal is received by the receiver E2 at the time $t_{i+1}+\Delta t$ as signal $\text{Sig}_{E2}*(t_{i+1}+\Delta t)$, and
wherein the transmitter S1 adjusts/determines the signal level $P(\text{Sig}_{S1}(t_{i+1}))$ and/or the carrier frequency $F(\text{Sig}_{S1}(t_{i+1}))$ of the signal $\text{Sig}_{S1}(t_{i+1})$ actually to be emitted at the time $t_{i+1}$ and/or the at least one damping parameter DP thus transmitted in such a way that for the predicted signal level $P_{predicted}(\text{Sig}_{E2}(t_{i+1}+\Delta t))$ of this signal received by the receiver E2 as $\text{Sig}_{E2}(t_{i+1}+\Delta t)$ the following applies: $G1 \leq P_{predicted}(\text{Sig}_{E2}(t_{i+1}+\Delta t)) \leq G2$ and/or for a predicted corresponding signal-to-noise ratio $\text{SNR}_{predicted}(\text{Sig}_{E2}(t_{i+1}+\Delta t))$ the following applies: $G3 \leq \text{SNR}_{predicted}(\text{Sig}_{E2}(t_{i+1}+\Delta t)) \leq G4$, where G1, G2, G3 and G4 are specified limit values.

* * * * *